US012756983B2

(12) United States Patent
Morton

(10) Patent No.: US 12,756,983 B2
(45) Date of Patent: Oct. 6, 2026

(54) WEARABLE DEVICE WITH BLOCKED SENSOR DETECTION

(71) Applicant: BOSE CORPORATION, Framingham, MA (US)

(72) Inventor: Douglas George Morton, Southborough, MA (US)

(73) Assignee: Bose Corporation, Framingham, MA (US)

( * ) Notice: Subject to any disclaimer, the term of this patent is extended or adjusted under 35 U.S.C. 154(b) by 149 days.

(21) Appl. No.: 18/764,040

(22) Filed: Jul. 3, 2024

(65) Prior Publication Data

US 2026/0012740 A1 Jan. 8, 2026

(51) Int. Cl.

*H04R 29/00* (2006.01)
*G10L 21/0208* (2013.01)
(Continued)

(52) U.S. Cl.

CPC ............ *H04R 29/005* (2013.01); *G10L 25/21* (2013.01); *H04R 3/005* (2013.01); *G10L 21/0208* (2013.01); *G10L 2021/02082* (2013.01); *G10L 2021/02165* (2013.01); *G10L 2021/02166* (2013.01); *H04M 9/082* (2013.01); (Continued)

(58) Field of Classification Search

CPC ......................... H04R 29/005; H04R 2430/01; H04R 1/1083; H04R 2201/107; H04R 2410/07; H04R 2460/01; H04R 3/005; G10L 25/21; G10L 21/0208; G10L 2021/02082; G10L 2021/02165; G10L 2021/02166; H04M 9/082

See application file for complete search history.

(56) References Cited

U.S. PATENT DOCUMENTS 9,648,421 B2 * 5/2017 Keane ...................... H04R 3/04
10,748,521 B1 * 8/2020 Mulvey ............ G10K 11/17881
(Continued)

FOREIGN PATENT DOCUMENTS

CN 115412824 A 11/2022

OTHER PUBLICATIONS

International Search Report and Written Opinion dated Oct. 15, 2025 for Application No. PCT/US2025/035760.

*Primary Examiner* — Carolyn R Edwards
*Assistant Examiner* — Kuassi A Ganmavo
(74) *Attorney, Agent, or Firm* — Patterson + Sheridan, LLP

(57) ABSTRACT

Techniques, including devices and systems implementing the techniques, for using speech enhancement to provide optimal denoised output. One example system generally includes a wearable device, a first sensor coupled to the wearable device, a second sensor coupled to the wearable device, and one or more processors coupled to the wearable device. The one or more processors, individually or collectively, may be generally configured to receive, at the first sensor, a first audio signal, receive, at the second sensor, a second audio signal, and determine a condition of the wearable device based, at least in part, on (i) a sum energy comprising an energy of the first audio signal and an energy of the second audio signal in a frequency range and on (ii) an energy difference between the energy of the first audio signal and the energy of the second audio signal in the frequency range.

18 Claims, 5 Drawing Sheets

(51) Int. Cl.

| | |
|---|---|
| ***G10L 21/0216*** | (2013.01) |
| ***G10L 25/21*** | (2013.01) |
| ***H04M 9/08*** | (2006.01) |
| ***H04R 3/00*** | (2006.01) |

(52) U.S. Cl.

CPC .... *H04R 2201/107* (2013.01); *H04R 2410/07* (2013.01); *H04R 2430/01* (2013.01); *H04R 2460/01* (2013.01)

(56) References Cited

U.S. PATENT DOCUMENTS

| | | | | |
|---|---|---|---|---|
| 2003/0198356 | A1* | 10/2003 | Thompson | H04R 25/407<br>381/23.1 |
| 2009/0196429 | A1* | 8/2009 | Ramakrishnan | H04R 29/004<br>381/26 |
| 2011/0069846 | A1* | 3/2011 | Cheng | H04R 3/005<br>381/92 |
| 2011/0317848 | A1* | 12/2011 | Ivanov | H04R 1/08<br>381/94.2 |
| 2012/0123772 | A1* | 5/2012 | Thyssen | G10L 21/0208<br>704/226 |
| 2013/0156224 | A1* | 6/2013 | Keane | H04R 3/04<br>381/107 |
| 2013/0329895 | A1* | 12/2013 | Dusan | H04R 29/004<br>381/56 |
| 2015/0055788 | A1* | 2/2015 | Zakis | H04R 3/002<br>381/71.1 |

* cited by examiner

WEARABLE DEVICE WITH BLOCKED SENSOR DETECTION

FIELD

Aspects of the disclosure generally relate to wearable devices, and, more particularly, to techniques to enable a wearable device to detect blocked sensors.

BACKGROUND

Wearable devices such as headphones or earbuds commonly provide for two way communication, in which the wearable device can both capture audio that may include user speech and output audio that includes the user speech to other devices. To capture user speech, the wearable device may use one or more sensors located somewhere on the device. However, the captured user speech may be negatively impacted by background noise present in the captured audio, or even by the conditions of one or more of the sensors used to capture the user speech. For example, the sensors used to capture user speech may also capture background noise that may include speech from other speakers (e.g., other people speaking near the user), as well as other unwanted non-speech noise (e.g., sneezing, crying, laughing, wind, or other ambient noise present in the environment surrounding the device). In another example, one or more of the sensors of the wearable device may be blocked. As a result of the presence of background noise in the captured audio and/or the condition of one or more of the sensors of the device, the wearable device may produce suboptimal output audio.

Accordingly, methods for providing improved output audio, as well as apparatuses and systems configured to implement these methods, are desired.

SUMMARY

All examples and features mentioned below can be combined in any technically possible way.

Aspects of the present disclosure provide a system. The system includes a wearable device, a first sensor coupled to the wearable device, a second sensor coupled to the wearable device, and one or more processors coupled to the wearable device. The one or more processors, individually or collectively, are configured to: receive, at the first sensor, a first audio signal, receive, at the second sensor, a second audio signal, and determine a condition of the wearable device based, at least in part, on a sum energy including an energy of the first audio signal and an energy of the second audio signal in a frequency range and on an energy difference between the energy of the first audio signal and the energy of the second audio signal in the frequency range.

In aspects, the one or more processors, individually or collectively, are further configured to: determine a gain difference between the energy of the first audio signal and the energy of the second audio signal in the frequency range, and apply a gain to the first audio signal to effectively compensate for the gain difference and form a scaled first audio signal.

In aspects, the one or more processors, individually or collectively, are further configured to: determine an energy of the scaled first audio signal in the frequency range; determine a scaled sum energy that includes the energy of the scaled first audio signal and the energy of the second audio signal, and determine a scaled energy difference between the scaled first audio signal and the second audio signal.

In aspects, the one or more processors, individually or collectively, are configured to determine the condition of the wearable device by: determining a first ratio using the sum energy and the energy difference, determining a second ratio using the scaled sum energy and the scaled energy difference, determining a third ratio using the first ratio and the second ratio, and determining that the condition of the wearable device is blocked when at least one of: the gain is above a gain threshold, the scaled energy difference is less than the energy difference by an energy threshold, or the third ratio is greater than a ratio threshold.

In aspects, the one or more processors, individually or collectively, are further configured to: determine the energy of the first audio signal in the frequency range, and determine the energy of the second audio signal in the frequency range.

In aspects, the frequency range includes 400 Hz to 1 kHz.

In aspects, when the condition of the wearable device is blocked, a condition of the second sensor is blocked when the gain is less than one, a condition of the first sensor is blocked when the gain is greater than one.

In aspects, when the condition of the wearable device is blocked, the one or more processors, individually or collectively, are further configured to: when the condition of the second sensor is blocked, mix the first audio signal to form an output audio signal, and when the condition of the first sensor is blocked, mix the second audio signal to form the output audio signal.

In aspects, a noise of the first audio signal and a noise of the second audio signal are both above a noise threshold.

Aspects of the present disclosure are directed to a method for audio signal processing in a wearable device. The method includes receiving, at a first sensor included in the wearable device, a first audio signal, receiving, at a second sensor included in the wearable device, a second audio signal, and determining a condition of the wearable device based, at least in part, on a sum energy including an energy of the first audio signal and an energy of the second audio signal in a frequency range and on an energy difference between the energy of the first audio signal and the energy of the second audio signal in the frequency range.

In aspects, the method further includes determining a gain difference between the energy of the first audio signal and the energy of the second audio signal in the frequency range, and applying a gain to the first audio signal to effectively compensate for the gain difference and form a scaled first audio signal.

In aspects, the method further includes determining an energy of the scaled first audio signal in the frequency range, determining a scaled sum energy that includes the energy of the scaled first audio signal and the energy of the second audio signal, and determining a scaled energy difference between the scaled first audio signal and the second audio signal.

In aspects, determining the condition of the wearable device includes: determining a first ratio using the sum energy and the energy difference, determining a second ratio using the scaled sum energy and the scaled energy difference, determining a third ratio using the first ratio and the second ratio, and determining that the condition of the wearable device is blocked when at least one of: the gain is above a gain threshold, the scaled energy difference is less than the energy difference by an energy threshold, or the third ratio is greater than a ratio threshold.

In aspects, the frequency range includes 400 Hz to 1 kHz.

In aspects, when the condition of the wearable device is blocked, a condition of the second sensor is blocked when the gain is less than one, a condition of the first sensor is blocked when the gain is greater than one.

Aspects of the present disclosure provide a non-transitory computer-readable medium including computer-executable instructions that, when executed by one or more processors of a device, cause the device to perform a method for audio signal processing, the method including: receiving, at a first sensor included in the wearable device, a first audio signal, receiving, at a second sensor included in the wearable device, a second audio signal, and determining a condition of the wearable device based, at least in part, on a sum energy including an energy of the first audio signal and an energy of the second audio signal in a frequency range and on an energy difference between the energy of the first audio signal and the energy of the second audio signal in the frequency range.

In aspects, the method further includes: determining a gain difference between the energy of the first audio signal and the energy of the second audio signal in the frequency range, and applying a gain to the first audio signal to effectively compensate for the gain difference and form a scaled first audio signal.

In aspects, the method further includes: determining an energy of the scaled first audio signal in the frequency range, determining a scaled sum energy that includes the energy of the scaled first audio signal and the energy of the second audio signal, and determining a scaled energy difference between the scaled first audio signal and the second audio signal.

In aspects, determining a condition of the wearable device includes: determining a first ratio using the sum energy and the energy difference, determining a second ratio using the scaled sum energy and the scaled energy difference, determining a third ratio using the first ratio and the second ratio, and determining that the condition of the wearable device is blocked when at least one of: the gain is above a gain threshold, the scaled energy difference is less than the energy difference by an energy threshold, or the third ratio is greater than a ratio threshold.

In aspects, the frequency range includes 400 Hz to 1 kHz.

Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements.

DETAILED DESCRIPTION

Figure 1:
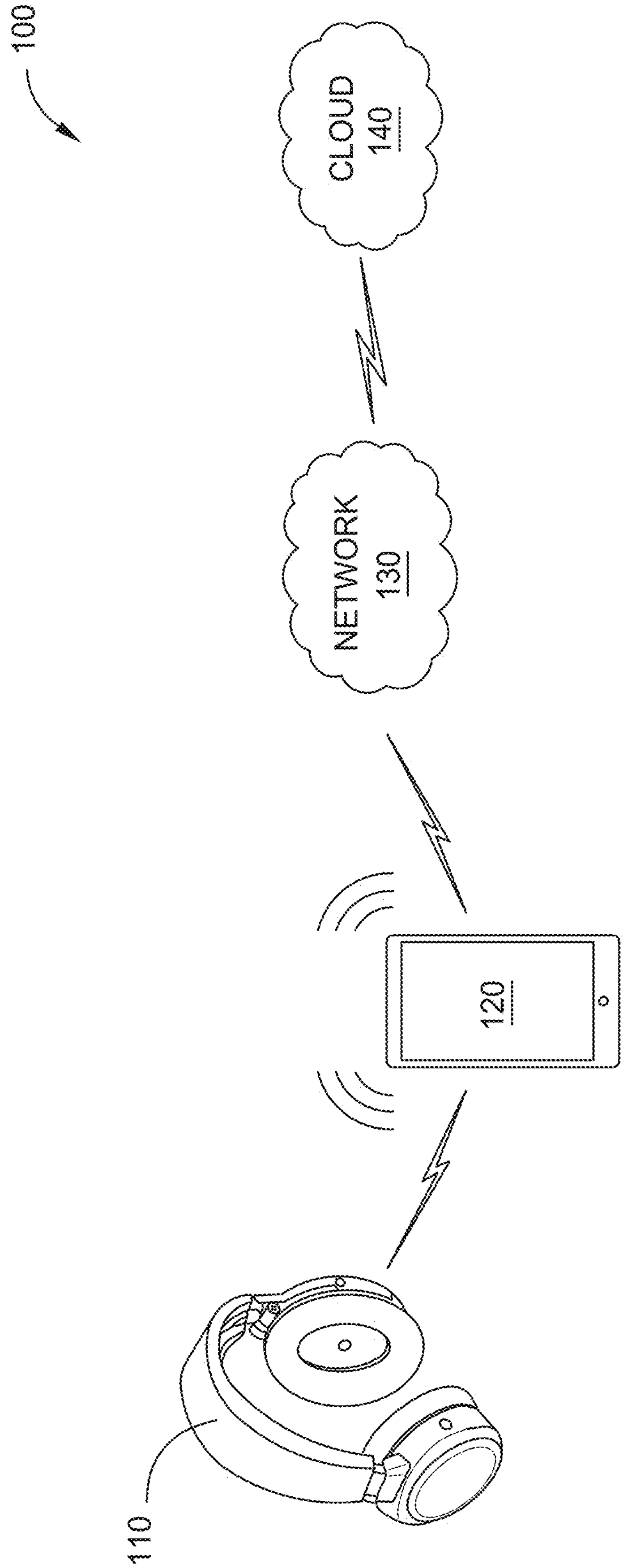
FIG. 1 illustrates an example system, in which aspects of the present disclosure may be implemented.

Certain aspects of the present disclosure provide techniques, including devices and systems implementing the techniques, for blocked sensor detection. Such techniques may involve receiving (e.g., capturing) a first audio signal at a first sensor included in a wearable device and a second audio signal at a second sensor included in the wearable device. The first sensor and the second sensor may each be implemented by a microphone located outside of the wearable device (e.g., outside the ear canal of a user of the wearable device). For example, when the wearable device is worn by a user, the first sensor may be located in one area of the outer ear (e.g., auricle or pinna) of the user and the second sensor may be located in another area of the auricle of the outer ear of the user. The first and second audio signals may include speech (e.g., a speech component) from the user of the device. The techniques may involve determining when one of the sensors of the wearable device is blocked (e.g., a condition of the wearable device) based, at least in part, on (i) a sum energy that includes an energy of the first audio signal in a frequency range (e.g., a range from 400 Hz to 1 kHz) and an energy of the second audio signal in the frequency range and on (ii) an energy difference between the energy of the first audio signal and the energy of the second audio signal in the frequency range. In certain aspects, a gain may be applied to one of the first audio signal or the second audio signal to effectively compensate for an energy difference between the audio signals. In this manner, a ratio determined using the ratio of the sum energy to the energy difference and the ratio of a scaled sum energy and a scaled energy difference may be compared to a ratio threshold to determine the condition of the wearable device, as will be described herein. The device may mix the first audio signal, the second audio signal, and/or a minimum variance distortionless response (MVDR) (e.g., determined using the first audio signal and the second audio signal) to provide an output audio signal that includes the speech of the user (e.g., for transmission to another device).

Many wearable devices may perform mixing of various audio signals (e.g., audio signals received at different sensors included in the wearable device) that include speech originating from a user of the device to provide an output audio signal (e.g., an audio signal for transmission to another device) that includes the user speech. However, wearable devices may struggle to provide an optimal output audio signal when the device is in noisier environments (e.g., when a signal-to-noise ratio (SNR) of the received audio signals is relatively low, such as between −10 dB and 2 dB, such as −6 dB, −3 dB, 1 dB, etc.). For example, when the environment of the device is windy (e.g., includes significant wind noise), the device may struggle to provide an optimal output audio signal. As a result, the intelligibility and naturalness of any output signal that includes the user speech may be impacted.

Some wearable devices may employ a wind detection system to determine when wind is impacting one or more of the sensors of the wearable devices, and adjust the mixing of the audio signals accordingly to compensate for the wind when providing the output audio signal. In some cases, wearable devices may determine an MVDR beamformer using the received audio signals for mixing. For example, when the condition of wearable device is windy, the wearable device may mix different combinations of the received audio signals and the MVDR for different frequencies to compensate for the wind when providing the output audio signal. In another example, when the condition of wearable device is not windy, the wearable device may use MVDR to provide the output audio signal.

However, one or more sensors may be inadvertently blocked or at least partially obstructed by, for example, a shape of the ear of the user or a hand or fingers of the user, which may cause the MVDR beamformer to collapse and thus negatively impact the audio mixing and the resultant output audio signal provided by the wearable device. Wearable devices may have difficulty determining when sensors are truly being impacted by wind or instead being impacted by one or more blocked sensors and thus struggle to compensate appropriately during mixing, because the energy of received audio signals being impacted by wind and the energy of received audio signals being impacted by a blocked sensor may be very similar. As such, distinguishing between a wearable device with being impacted by wind and a wearable device in a blocked condition (e.g., when or more sensors of the wearable device are blocked) is desirable.

The present disclosure may enable a wearable device to use one or more audio signals received at one or more sensors in the wearable device to provide optimal output audio signal using blocked sensor detection. As a result of using the blocked sensor detection described herein, the device may be capable of properly distinguishing between the blocked and windy condition to determine the condition of the one or more sensors of the wearable device (e.g., whether one or more of the sensors of the device is receiving audio signals differently and the condition of the device is blocked, whether the condition of the device is not blocked and windy, or whether the condition of the device is not blocked and not windy). In this manner, the wearable device may be able to appropriately mix the received audio signals and/or the MVDR based on the condition of the wearable device to provide an optimal output audio signal.

An Example System

FIG. 1 illustrates an example system 100, in which aspects of the present disclosure may be implemented. As shown, system 100 includes one or more sound processing and playback devices 110 (e.g., a wireless audio device, such as a wearable device as shown in FIG. 1) communicatively coupled with a source device 120 (e.g., a computing device or user device, such as a smartphone, tablet, computer, television, or the like). Throughout the present disclosure, the sound processing and playback device 110 may be referred to simply as the wearable device 110. The wearable device 110 may be configured to be worn by a user and may be a headset that includes two or more speakers and two or more sensors, as illustrated in FIG. 1. The source device 120 is illustrated as a smartphone or a tablet computer wirelessly paired with the wearable device 110. At a high level, the wearable device 110 may play audio content transmitted from the source device 120. The user may use the graphical user interface (GUI) on the source device 120 to select the audio content and/or adjust settings of the wearable device 110. The wearable device 110 provides soundproofing, active noise cancellation, and/or other audio enhancement features to play the audio content transmitted from the source device 120.

In certain aspects, the wearable device 110 includes voice activity detection (VAD) circuitry capable of detecting the presence of speech signals (e.g., human speech signals) in a sound signal received by sensors (not illustrated) of the wearable device 110. For instance, the sensors of the wearable device 110 may be implemented as microphones and may receive ambient and external sounds in the vicinity of the wearable device 110, including speech uttered by the user. The sound signal received by the sensors may have the speech signal mixed in with other sounds in the vicinity of the wearable device 110. Using the VAD, the wearable device 110 may detect and extract the speech signal from the received sound signal. In certain aspects, the VAD circuitry may be used to detect and extract speech uttered by the user in order to facilitate a voice call, voice chat between the user and another person, or voice commands for a virtual personal assistant (VPA), such as a cloud based VPA. In some cases, detections or triggers can include self-VAD (only starting up when the user is speaking, regardless of whether others in the area are speaking), active transport (sounds captured from transportation systems), head gestures, buttons, computing device based triggers (e.g., pause/un-pause from the phone), changes with input audio level, and/or audible changes in environment, among others. The voice activity detection circuitry may run or assist running the blocked sensor detection disclosed herein.

In certain aspects, the wearable device 110 includes speaker identification circuitry capable of detecting an identity of a speaker to which a detected speech signal relates to. For example, the speaker identification circuitry may analyze one or more characteristics of a speech signal detected by the VAD circuitry and determine that the user of the wearable device 110 is the speaker. In certain aspects, the speaker identification circuitry may use any of the existing speaker recognition methods and related systems to perform the speaker recognition.

The wearable device 110 further includes hardware and circuitry including processor(s)/processing system and memory configured to implement one or more sound management capabilities or other capabilities including, but not limited to, noise canceling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry. The noise cancelling circuitry is configured to reduce unwanted ambient sounds external to the wearable device 110 by using active noise cancelling (also known as active noise reduction). The sound masking circuitry is configured to reduce distractions by playing masking sounds via the speakers of the wearable device 110. The movement detecting circuitry is configured to use devices/sensors such as an accelerometer, gyroscope, magnetometer, or the like to detect whether the user wearing the wearable device 110 is moving (e.g., walking, running, in a moving mode of transport, etc.) or is at rest and/or the direction the user is looking or facing. The movement detecting circuitry may also be configured to detect a head position of the user for use in determining an event, as will be described herein, as well as in augmented reality (AR) applications where an AR sound is played back based on a direction of gaze of the user.

In certain aspects, the wearable device 110 is wirelessly connected to the source device 120 using one or more wireless communication methods including, but not limited to, Bluetooth, Wi-Fi, Bluetooth Low Energy (BLE), other radio frequency (RF) based techniques, or the like. In certain aspects, the wearable device 110 includes a transceiver that transmits and receives data via one or more antennae in order to exchange audio data and other information with the source device 120.

In certain aspects, the wearable device 110 includes communication circuitry capable of transmitting and receiving audio data and other information from the source device 120. The wearable device 110 also includes an incoming audio buffer, such as a render buffer, that buffers at least a portion of an incoming audio signal (e.g., audio packets) in order to allow time for retransmissions of any missed or dropped data packets from the source device 120. For example, when the wearable device 110 receives Bluetooth transmissions from the source device 120, the communication circuitry typically buffers at least a portion of the incoming audio data in the render buffer before the audio is actually rendered and output as audio to at least one of the transducers (e.g., audio speakers) of the wearable device 110. This is done to ensure that even if there are RF collisions that cause audio packets to be lost during transmission, there is time for the lost audio packets to be retransmitted by the source device 120 before the lost audio packets have been rendered by the wearable device 110 for output by one or more acoustic transducers of the wearable device 110.

The wearable device 110 is illustrated as over-the-head headphones; however, the techniques described herein apply to other wearable devices, such as wearable audio devices, including any audio output device that fits around, on, in, or near an ear (including open-ear audio devices worn on the head or shoulders of a user) or other body parts of a user, such as head or neck. The wearable device 110 may take any form, wearable or otherwise, including standalone devices (including automobile speaker system), stationary devices (including portable devices, such as battery powered portable speakers), headphones (including over-ear headphones, on-ear headphones, in-ear headphones), earphones, earpieces, headsets (including virtual reality (VR) headsets and AR headsets), goggles, headbands, earbuds, armbands, sport headphones, neckbands, hearing aids, or eyeglasses. In certain aspects, the wearable device 110 may be implemented as a banded headset with two cups each configured to deliver audio output.

In certain aspects, the wearable device 110 is connected to the source device 120 using a wired connection, with or without a corresponding wireless connection. The source device 120 may be a smartphone, a tablet computer, a laptop computer, a digital camera, or other computing device that connects with the wearable device 110. As shown, the source device 120 can be connected to a network 130 (e.g., the Internet) and may access one or more services over the network. As shown, these services can include one or more cloud 140 services.

In certain aspects, the source device 120 can access a cloud server in the cloud 140 over the network 130 using a mobile web browser or a local software application or "app" executed on the source device 120. In certain aspects, the software application or "app" is a local application that is installed and runs locally on the source device 120. In certain aspects, a cloud server accessible on the cloud 140 includes one or more cloud applications that are run on the cloud server. The cloud application may be accessed and run by the source device 120. For example, the cloud application can generate web pages that are rendered by the mobile web browser on the source device 120. In certain aspects, a mobile software application installed on the source device 120 or a cloud application installed on a cloud server, individually or in combination, may be used to implement the techniques for low latency Bluetooth communication between the source device 120 and the wearable device 110 in accordance with aspects of the present disclosure. In certain aspects, examples of the local software application and the cloud application include a gaming application, an audio AR or VR application, and/or a gaming application with audio AR or VR capabilities. The source device 120 may receive signals (e.g., data and controls) from the wearable device 110 and send signals to the wearable device 110.

An Example Wearable Device

Figure 2:
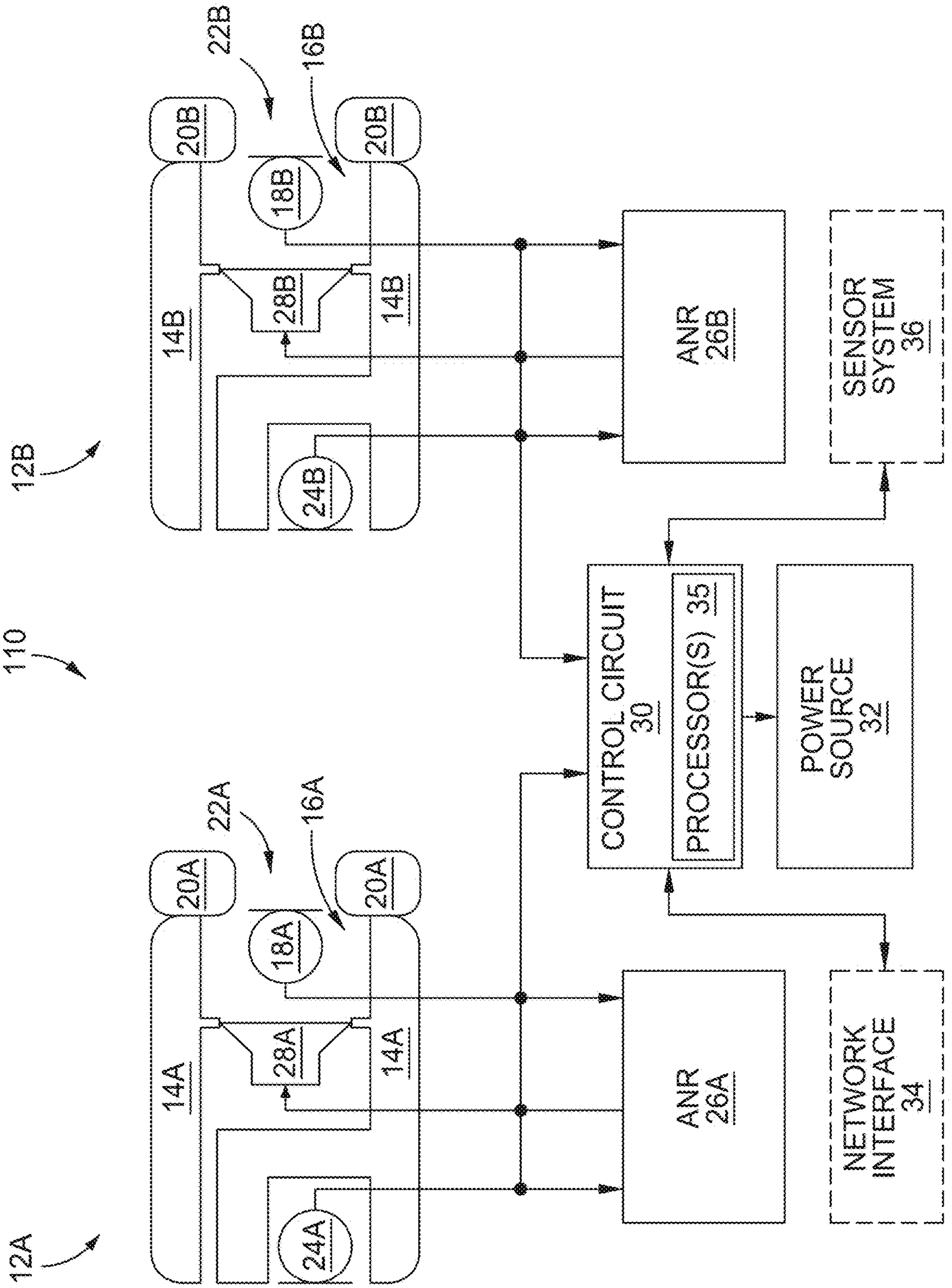
FIG. 2 illustrates an exemplary wireless audio device, in which aspects of the present disclosure may be implemented.

FIG. 2 illustrates an exemplary wearable device 110 and some of its components, in which aspects of the present disclosure may be implemented. Other components may be inherent in the wearable device 110 and not shown in FIG. 2. As shown, the wearable device 110 includes two earpieces 12A and 12B, each configured to direct sound towards an ear of the user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal sensors (e.g., inner microphone(s)) 18 may be disposed within cavity 16. In implementations where the wearable device 110 is ear-mountable, an ear coupling 20 (e.g., an ear tip or ear cushion) may be attached to the casing 14 and surround an opening to the cavity 16. A passage 22 is formed through the ear coupling 20 and communicates with the opening to the cavity 16. In some examples, one or more outer sensors 24 are disposed on the casing in a manner that permits acoustic coupling to the environment external to the casing. The inner sensor(s) 18 and the outer sensor(s) 24 may each be implemented and/or referred to as a microphone, an accelerometer, and/or an inertial measurement unit (IMU).

In implementations that include active noise reduction (ANR) (which may include active noise cancellation (ANC) or controllable noise canceling (CNC)), the inner sensor(s) 18 may be an internal microphone(s) or feedback microphone(s) and the outer sensor(s) 24 may be feedforward microphone(s). In such implementations, each earpiece 12 includes an ANR circuit 26 that is in communication with the inner sensors 18 and outer sensors and 24. The ANR circuit 26 receives an inner signal generated by the inner sensor(s) 18 and an outer signal generated by the outer sensor(s) 24 and performs an ANR process for the corresponding earpiece 12. The process includes providing a signal to an electroacoustic transducer 28 (e.g., speaker) disposed in the cavity 16 to generate an anti-noise acoustic signal that reduces or substantially prevents sound from one or more acoustic noise sources that are external to the earpiece 12 from being heard by the user. In addition to providing an anti-noise acoustic signal, the electroacoustic transducer 28 may utilize its sound-radiating surface for providing an audio output for playback (e.g., for a continuous audio feed).

In certain aspects, the wearable device 110 may also include a control circuit 30. The control circuit 30 is in communication with the inner sensor(s) 18, outer sensor(s) 24, and electroacoustic transducers 28, and receives the inner and/or outer microphone signals. In some cases, the control circuit 30 includes one or more microcontroller(s) or processor(s) 35, including for example, a digital signal processor (DSP) and/or an advanced reduced instruction set computer (RISC) machine (ARM) chip. In some cases, the microcontroller(s)/processor(s) (or simply, processor(s)) 35 may include multiple chipsets for performing distinct functions. For example, the processor(s) 35 may include a DSP chip for performing music and voice related functions, and a co-processor such as an ARM chip (or chipset) for performing sensor related functions.

The control circuit 30 may also include analog to digital converters for converting the inner signals from the two inner sensors 18 and/or the outer signals from the two outer sensors 24 to digital format. In response to the received inner and/or outer microphone signals, the control circuit 30 (including processor(s) 35) may take various actions. For example, audio playback may be initiated, paused, or resumed, a notification to a user (e.g., wearer) may be provided or altered, and a device (e.g., a cellular phone, a handheld device, a wireless device, a laptop computer, a tablet, a smartphone, an Internet of things (IOT) device, a wearable device, an AR device, a VR device, etc.) in communication with the wearable device 110 may be controlled. The wearable device 110 may also include a power source 32. The control circuit 30 and power source 32 may be in one or both of the earpieces 12 or may be in a separate housing in communication with the earpieces 12. The wearable device 110 may also include a network interface 34 to provide communication between the wearable device 110 and one or more audio sources or other personal audio devices (e.g., source device 120 as illustrated in FIG. 1). The network interface 34 may be wired (e.g., Ethernet) or wireless (e.g., employ a wireless communication protocol such as IEEE 802.11, Bluetooth, Bluetooth Low Energy (BLE), or other local area network (LAN) or personal area network (PAN) protocols).

The network interface 34 is shown in phantom, as portions of the network interface 34 may be located remotely from the wearable device 110. The network interface 34 may provide for communication between the wearable device 110, audio sources, and/or other networked (e.g., wireless) speaker packages and/or other audio playback devices via one or more communications protocols. The network interface 34 may provide either or both of a wireless interface and a wired interface. The wireless interface may allow the wearable device 110 to communicate wirelessly with other devices in accordance with any communication protocol noted herein. In some particular cases, a wired interface may be used to provide network interface functions via a wired (e.g., Ethernet) connection.

In certain aspects, the network interface 34 may also include one or more network media processor(s) for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, when a user connects an AirPlay® enabled device, such as an iPhone or iPad device, to the network, the user may then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor(s) through (e.g., through a USB bridge) to the control circuit 30. As noted herein, in some cases, the control circuit 30 may include one or more processor(s) and/or microcontroller(s) (simply, "processor(s)" 35), which can include decoders, digital signal processors (DSPs) hardware/software, ARM processor(s) hardware/software, etc. for playing back (rendering) audio content at electroacoustic transducers 28. In some cases, the network interface 34 may also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor(s) or microcontroller(s) (e.g., processor(s) 35). The control circuit 30 may execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the wearable device 110, such as control of user interfaces (not shown) and applications run by the wearable device 110.

In addition to a processor(s) and/or microcontroller(s), control circuit 30 may also include one or more digital-to-analog (D/A) converters for converting the digital audio signal to an analog audio signal. This audio hardware may also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 may include, for example, flash memory and/or non-volatile random access memory (NVRAM). In some implementations, instructions (e.g., software) are stored in an information carrier. The instructions, when executed by one or more processing devices (e.g., the processor(s) or microcontroller(s) in control circuit 30), perform one or more processes, such as those described elsewhere herein. The instructions can also be stored by one or more storage devices, such as one or more (e.g., non-transitory) computer or machine-readable mediums (for example, the memory, or memory on the processor(s)/microcontroller(s)). As described herein, the control circuit 30 (e.g., memory, or memory on the processor(s)/microcontroller(s)) may include a control system including instructions for controlling directional audio selection functions according to various particular implementations. It is understood that portions of the control circuit 30 (e.g., instructions) could also be stored in a remote location or in a distributed location and could be fetched or otherwise obtained by the control circuit 30 (e.g., via any communications protocol described herein) for execution. The instructions may include instructions for controlling device functions based upon detected don/doff events (i.e., the software modules include logic for processing inputs from a sensor system to manage audio functions), as well as digital signal processing and equalization.

The wearable device 110 may also include a sensor system 36 coupled with control circuit 30 for detecting one or more conditions of the environment proximate the wearable device 110. The sensor system 36 may include inner sensor(s) 18 and/or outer sensors 24, sensors for detecting inertial conditions at the personal audio device, and/or sensors for detecting conditions of the environment proximate the wearable device 110, as described herein. Sensor system 36 may also include one or more proximity sensors, such as a capacitive proximity sensor or an IR sensor, and/or one or more optical sensors.

The sensors may be on-board the wearable device 110 or may be remote or otherwise wirelessly (or hard-wired) connected to the wearable device 110. As described further herein, sensor system 36 may include a plurality of distinct sensor types for detecting proximity information, inertial information, environmental information, or commands at the wearable device 10. In particular implementations, sensor system 36 may enable detection of user movement, including movement of a user's head or other body part(s). Portions of sensor system 36 may incorporate one or more movement sensors, such as accelerometers, gyroscopes and/or magnetometers and/or a single IMU having three-dimensional (3D) accelerometers, gyroscopes and a magnetometer.

In various implementations, the sensor system 36 can be located at the wearable device 110 (e.g., where a proximity sensor is physically housed in the wearable device 110). In some examples, the sensor system 36 is configured to detect a change in the position of the wearable device 110 relative to the user's head (e.g., detect the device operating state). Data indicating the change in the position of the wearable device 110 may be used to trigger a command function, such as activating an operating mode of the wearable device 110, modifying playback of audio at the wearable device 110 (e.g., by modifying the audio, noise cancellation (e.g., ANC), or transparency of the wearable device), or controlling a power function of the wearable device 110.

The sensor system 36 may also include one or more interface(s) for receiving commands at the wearable device 110. For example, sensor system 36 may include an interface permitting a user to initiate functions of the wearable device 110. In a particular example implementation, the sensor system 36 may include, or be coupled with, a capacitive touch interface for receiving tactile commands on the wearable device 110.

In other implementations, as illustrated in the phantom depiction in FIG. 2, one or more portions of the sensor system 36 may be located at another device capable of indicating movement and/or inertial information about the user of the wearable device 110. For example, in some cases, the sensor system 36 may include an IMU physically housed in a hand-held device such as a smart device (e.g., smart phone, tablet, etc.) a pointer, or in another wearable audio device. In particular example implementations, at least one of the sensors in the sensor system 36 may be housed in a wearable audio device distinct from the wearable device 110, such as where wearable device 110 includes headphones and an IMU is located in a pair of glasses, a watch, or other wearable electronic device.

In certain aspects, the control circuit 30 is in communication with the inner sensor(s) 18 and receives the two inner signals. Alternatively, the control circuit 30 may be in communication with the outer sensors 24 and receive the two outer signals. In another alternative, the control circuit 30 may be in communication with both the inner sensor(s) 18 and outer sensors 24 and receives the two inner and two outer signals. It should be noted that in some implementations, there may be multiple inner and/or outer microphones in each earpiece 12. As noted herein, the control circuit 30 may include one or more microcontroller(s) or processor(s) having a DSP and the inner signals from the two inner sensor(s) 18 and/or the outer signals from the two outer sensors 24 are converted to digital format by analog to digital converters. In response to the received inner and/or outer signals, the control circuit 30 may take various actions. For example, the power supplied to the wearable device 110 may be reduced upon a determination that one or both earpieces 12 are off-head. In another example, full power may be returned to the wearable device 110 in response to a determination that at least one earpiece becomes on head. Other aspects of the wearable device 110 may be modified or controlled in response to determining that a change in the operating state of the earpiece 12 has occurred. For example, ANR functionality may be enabled or disabled, audio playback may be initiated, paused or resumed, a notification to a wearer may be altered, and a device (e.g., a cellular phone, a handheld device, a wireless device, a laptop computer, a tablet, a smartphone, an Internet of things (IOT) device, a wearable device, an AR device, a VR device, etc.) in communication with the wearable device 110 may be controlled. As illustrated, the control circuit 30 generates a signal that is used to control a power source 32 for the wearable device 110. The control circuit 30 and power source 32 may be in one or both of the earpieces 12 or may be in a separate housing in communication with the earpieces 12.

Example Operations for Blocked Sensor Detection During Audio Signal Processing Certain aspects of the present disclosure provide techniques, including devices and systems implementing the techniques, for blocked sensor detection. Such techniques may involve determining a condition of the wearable device based, at least in part, on one or more of (i) a sum energy that includes an energy of a first audio signal (e.g., received at a first sensor included in the wearable device) in a frequency range (e.g., a range from 400 Hz to 1 kHz) and an energy of the second audio signal (e.g., received at a second sensor included in the wearable device) in the frequency range, on (ii) an energy difference between the energy of the first audio signal and the energy of the second audio signal in the frequency range, on (iii) a scaled sum energy that includes a scaled energy of one of a scaled audio signal (e.g., one of the first audio signal or the second audio signal) and an unscaled energy (e.g., the other of the first audio signal or the second audio signal) in the frequency range, and on (iv) a scaled energy difference between the energy of the scaled audio signal and the unscaled audio signal in the frequency range. The device may mix the first audio signal, the second audio signal, and/or an MVDR determined using the first audio signal and the second audio signal to provide an output audio signal that includes speech from the user of the wearable device (e.g., for transmission to another device). As a result of utilizing the blocked sensor detection described herein, the wearable device may be able to distinguish between a windy condition and a blocked condition of the wearable device to properly determine the condition of the wearable device, and thereafter appropriately mix the received audio signals and/or the MVDR to provide the optimal output audio signal.

Figure 3:
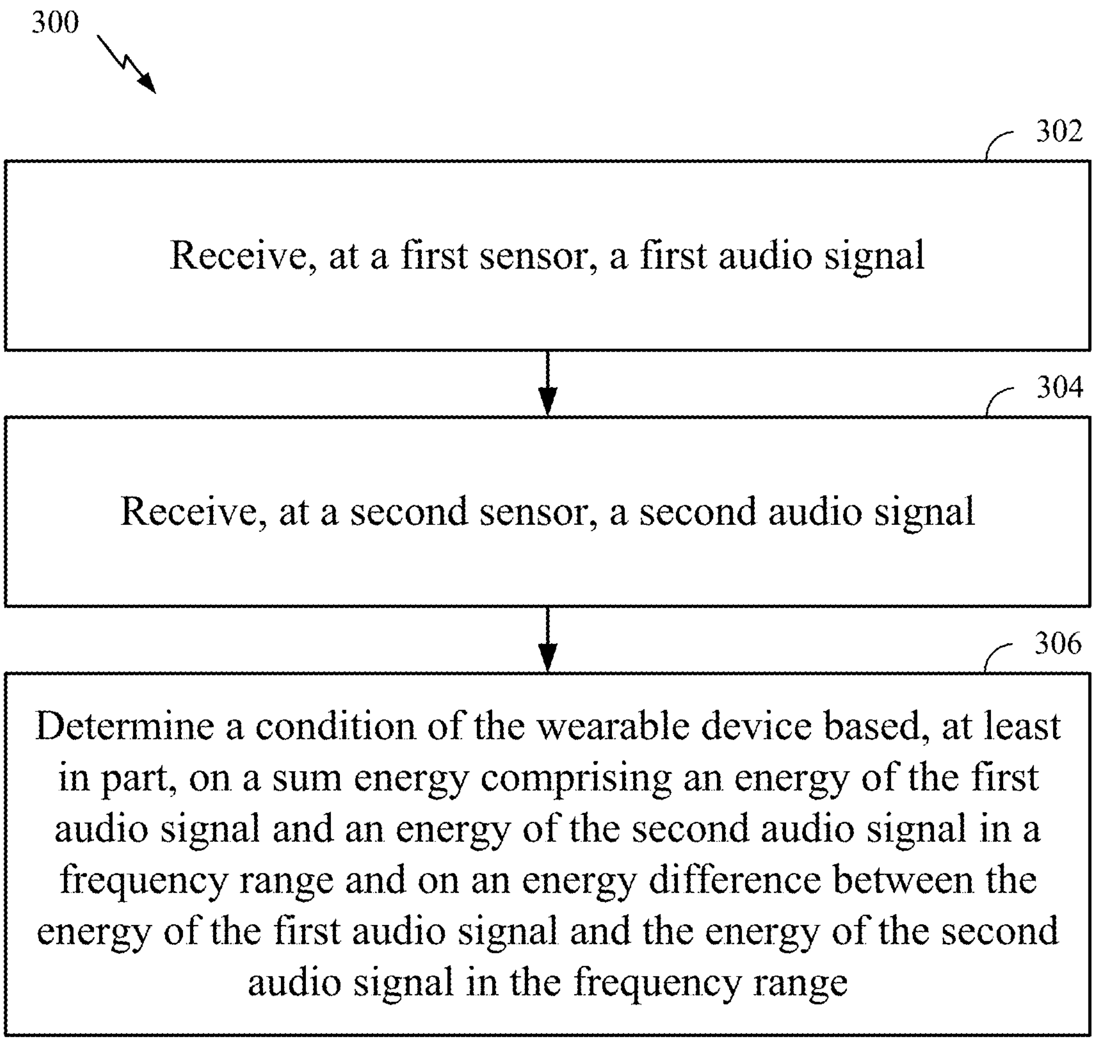
FIG. 3 illustrates example operations for audio signal processing performed by a device, according to certain aspects of the present disclosure.
Figure 4A:
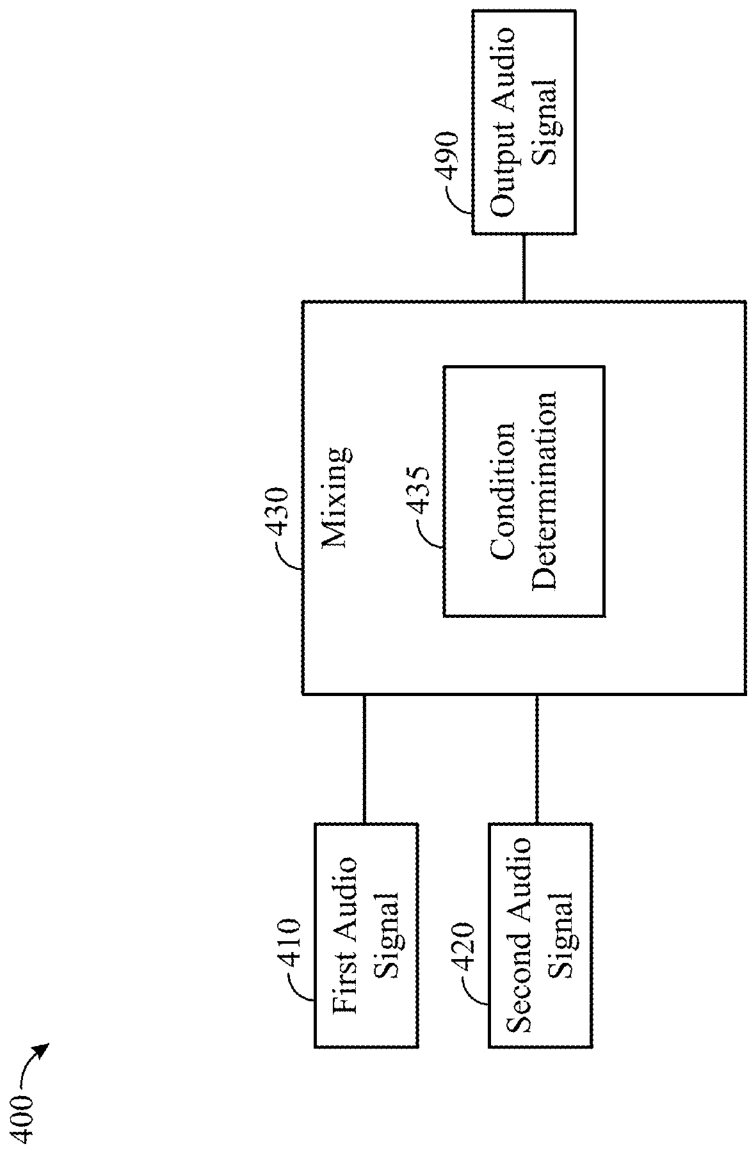
FIG. 4A is a block diagram of an example process flow for blocked sensor detection during the operations of FIG. 3 for audio signal processing, according to certain aspects of the present disclosure.
Figure 4B:
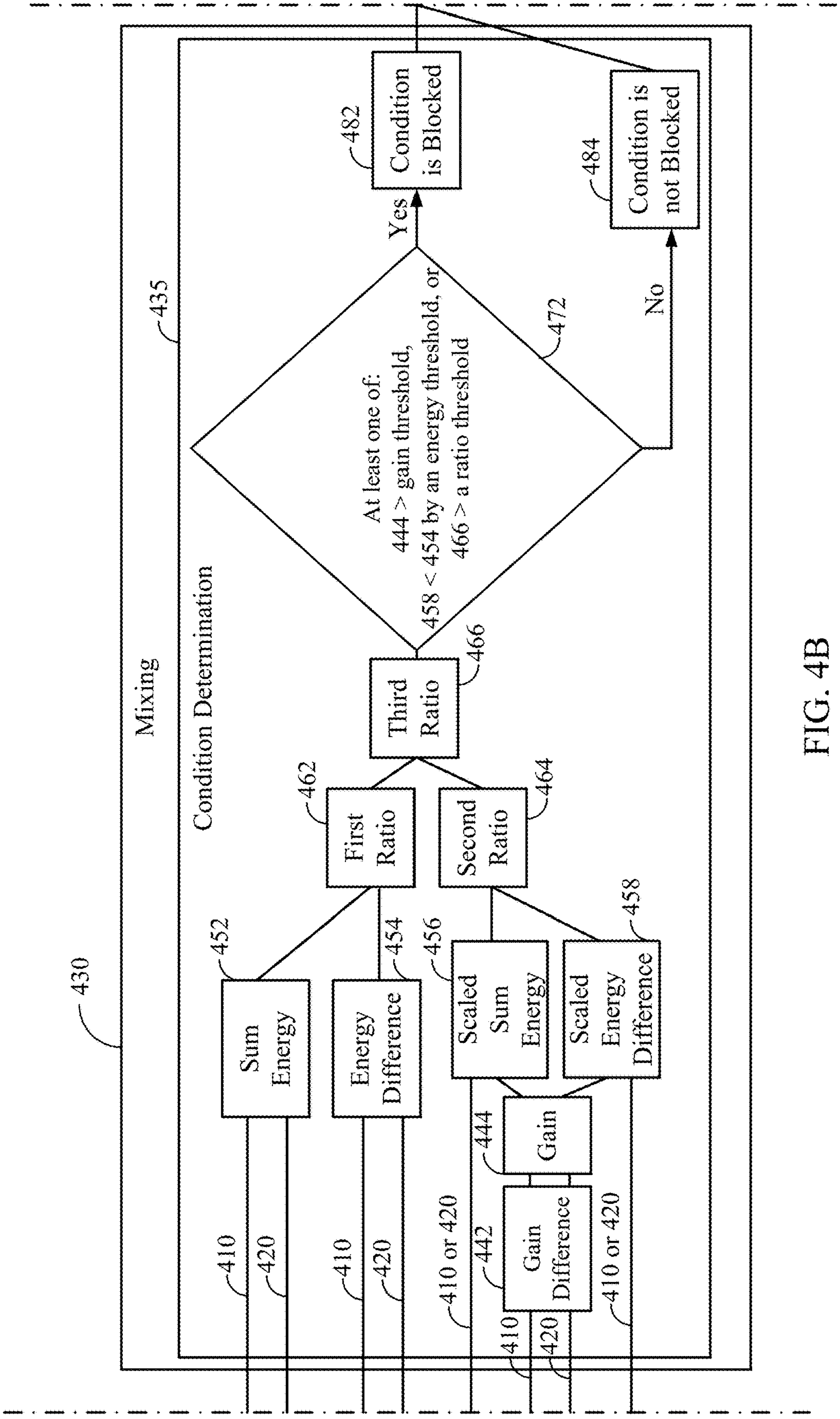
FIG. 4B is a block diagram of a mixing stage of the example process flow of FIG. 4A for blocked sensor detection, according to certain aspects of the present disclosure.

FIG. 3 illustrates example operations 300 for audio signal processing performed by a device (e.g., the wearable device 110 of FIGS. 1 and 2), according to certain aspects of the present disclosure. FIG. 4A is a block diagram of an example process flow 400 for blocked sensor detection during the operations 300 of FIG. 3 for audio signal processing, according to certain aspects of the present disclosure. FIG. 4B is a block diagram of the mixing 430 of the example process flow 400 of FIG. 4A for blocked sensor detection, according to certain aspects of the present disclosure. Therefore, FIG. 3 and FIGS. 4A and 4B are herein described together for clarity. The operations 300 and the process flows 400 may be performed by a wearable device (e.g., the wearable device 110 of FIG. 1 and FIG. 2), or by a control circuit (e.g., control circuit 30) of the device (e.g., using one or more processors, individually or collectively, included in the control circuit). The operations 300 and the process flow 400 may be utilized by the device continuously, periodically, or selectively.

The operations 300 may include, at block 302, receiving, at a first sensor (e.g., outer sensor(s) 24) coupled to the device, a first audio signal 410. In certain aspects, the first sensor may include or be implemented by a microphone outside the ear canal of the user of the device (e.g., implemented and/or referred to herein as an "external microphone," an "outside microphone," or an "out-of-user canal microphone").

At block 304, the operations 300 may include receiving, at a second sensor (e.g., outer sensor(s) 24), a second audio signal 420. In certain aspects, the second sensor may include or be implemented by a microphone outside the ear canal of the user of the device (e.g., implemented and/or referred to herein as an "external microphone," an "outside microphone," or an "out-of-user canal microphone"). In some cases, one or more envelope followers may be used on first audio signal 410 and/or the second audio signal 420. In certain aspects, one or more of the first sensor or the second sensor may be implemented by, for example, a bone conduction sensor and/or transducer (e.g., an internal microphone inside an ear canal of a user of the device, an internal microphone facing the ear canal on an around ear device, a voice band accelerometer outside the ear canal, a feedback microphone, a voice pickup unit (VPU), or the like). In certain aspects, an equalization (e.g., an equalization that adjusts magnitude and/or phase) may be applied to the audio signal received at one or more of the first sensor, the second sensor, and one or more additional sensors. The applied equalization may be configured to align the first sensor, the second sensor, and/or one or more additional sensors.

According to certain aspects, the operations 300 may further include determining the energy of the first audio signal 410 in the frequency range and determining the energy of the second audio signal 420 in the frequency range. According to certain aspects, a noise of the first audio signal 410 and/or a noise of the second audio signal 420 may both be above a noise threshold (e.g., any noise threshold between, for example, 1 dB and 140 dB). For example, the operations 300 may be performed when the noise of the first audio signal 410 and/or the noise of the second audio signal 420 are both above the noise threshold. In this manner, the first audio signal 410 and/or the second audio signal 420 may be sufficiently loud enough for the operations 300 to be performed.

The first audio signal 410 and/or the second audio signal 420 may undergo energy smoothing at one or more times during the operations 300 (e.g., during any energy calculations). Although the first audio signal 410 and the second audio signal 420 may undergo processing according to the process flow 400, the first audio signal 410 and the second audio signal 420 may continue to be referred to as the first audio signal 410 and the second audio signal 420 respectively in their various processed states during processing (e.g., during scaling, energy smoothing, and mixing 430).

At block 306, the operations 300 may include determining a condition of the wearable device (e.g., condition determination 435) based, at least in part, on (i) a sum energy 452 including an energy of the first audio signal 410 and an energy of the second audio signal 420 in a frequency range (e.g., first audio signal 410 plus second audio signal 420) and on (ii) an energy difference 454 between the energy of the first audio signal 410 and the energy of the second audio signal 420 in the frequency range (e.g., first audio signal 410 minus second audio signal 420). In certain aspects, the frequency range may be or may include a frequency range of 400 Hz to 1 kHz. The operations 300 may be performed, for example, separately for each frequency bin within the frequency range, or for some combination or group of frequency bins within the frequency range. In some cases, the operations 300 may determine that the condition of the wearable device is blocked 482 after performing the operations 300 for a single frequency bin within the frequency range, or after performing the operations 300 for some combination or group of frequency bins within the frequency range. In certain aspects, the frequency range may be divided into one or more different frequency bins. Any frequency bin widths may be used for any frequency range. For example, the frequency range may be from 400 Hz to 1 kHz, and the frequency range may be divided into 5 frequency bins each having 125 Hz bin widths. The operations 300 may also be performed, for example, in the time domain.

According to certain aspects, the operations 300 may further include determining a gain difference 442 between the energy of the first audio signal 410 and the energy of the second audio signal 420 in the frequency range, and applying a gain 444 to one of the first audio signal 410 or the second audio signal 420 to form a scaled first audio signal 410 or scaled second audio signal 420, which may be referred to herein simply as scaled audio signal. The remaining unscaled first audio signal 410 or unscaled second audio signal 420 may be referred to herein simply as the unscaled audio signal. The applied gain 444 may effectively compensate for the gain difference 442 (e.g., to effectively correlate the first audio signal 410 to the second audio signal 420, or vice versa, depending on which audio signal the gain 444 is applied to). In certain aspects, the gain difference 442 and/or the gain 444 may be applied iteratively in a loop (e.g., the gain 444 may be applied incrementally by slowly increasing the gain 444 in small amounts while observing the gain difference 442 until the gain difference 442 approaches (or becomes) zero).

According to certain aspects, the operations 300 may further include (i) determining an energy of the scaled audio signal (e.g., the scaled first audio signal 410 or the scaled second audio signal 420) in the frequency range, (ii) determining a scaled sum energy 456 that includes the energy of the scaled audio signal and the energy of the unscaled audio signal (depending on which audio signal the gain 444 is applied to and which audio signal is left unscaled), and (iii) determining a scaled energy difference 458 between the scaled audio signal and unscaled the audio signal (e.g., scaled audio signal minus unscaled audio signal).

The operations 300 may enable the wearable device to determine whether the condition of the wearable device is blocked 482 or whether the condition of the wearable device is not blocked 484. According to certain aspects, determining the condition of the wearable device at block 306 may include (i) determining a first ratio 462 using the sum energy 452 and the energy difference 454, (ii) determining a second ratio 464 using the scaled sum energy 456 and the scaled energy difference 458, and/or (iii) determining a third ratio 466 using the first ratio and the second ratio. The first ratio 462 may be equal to the energy difference 454 divided by the sum energy 452 (e.g., 454/452), the second ratio 464 may be equal to the scaled energy difference 458 divided by the scaled sum energy 456 (e.g., 458/456), and/or the third ratio 466 may be equal to the first ratio 462 divided by the second ratio 464 (e.g., 462/464). In this manner, the relative change between the energy difference 454/sum energy 452 and the scaled energy difference 458/scaled sum energy 456 may be ascertained. In certain aspects, the condition of the wearable device may be determined to be blocked 482 when at least one of: (i) the gain 444 is above a gain threshold (e.g., a gain threshold of +/− 6 dB), (ii) the scaled energy difference 458 is less than the energy difference 454 by an energy threshold (e.g., an energy threshold of at least 6-12 dB, such that the scaled energy difference 458 is at least 6-12 dB lower than the energy difference 454), or (iii) the third ratio 466 is greater than a ratio threshold (e.g., such that the second ratio 464 is, for example, about 3 dB less than the first ratio 462), as illustrated at block 472. In some cases, the condition of the wearable device may be determined to be blocked when all three of: the gain 444 is above the gain threshold, the scaled energy difference 458 is less than the energy difference 454 by the energy threshold, and the third ratio 466 determined using the first ratio 462 and the second ratio 464 is greater than the ratio threshold. The determination that the third ratio 466 is greater than the ratio threshold may be performed by determining that energy difference 454 multiplied by scaled sum energy 456 is greater than ((scaled energy difference 458 multiplied by sum energy 452) multiplied by gain 444).

In certain aspects, the gain threshold may be configured to prevent small deviations on the head of the user from causing the wearable device to incorrectly determine that the condition is blocked 482 during the operations 300. In certain aspects, determining that the condition of the wearable device is blocked 482 may also confirm that the condition of the wearable device is not windy. For example, when the scaled energy difference 458 is less than the energy difference 454 by the energy threshold, the condition of the wearable device may be determined to be not windy, regardless of whether or not the condition of the wearable device has been determined to be blocked 482 or not blocked 484.

In some cases, when the second audio signal 420 is subtracted from the first audio signal 410 and the first audio signal 410 and the second audio signal 420 are from two sensors included in the wearable device and located relatively close together, the first audio signal 410 and the second audio signal 420 may effectively cancel each other out. In other cases, when you subtract the second audio signal 420 from the first audio signal 410 when the two sensors are located relatively far apart, the first audio signal 410 and the second audio signal 420 may not cancel each other out well. When the first audio signal 410 and the second audio signal 420 do not cancel each other out well, the gain 444 may be applied to correlate the two audio signals, as described above. When the first audio signal 410 and the second audio signal 420 have been correlated, the first ratio 462 and second ratio 464 may be determined. When the third ratio 466 determined using the first ratio 462 and the second ratio 464 is greater than the ratio threshold, the condition of the wearable device may be blocked, and at least one of the first sensor and the second sensor may be blocked.

According to certain aspects, when the condition of the wearable device is blocked, the operations 300 may include determining whether one or both of the first sensor and the second sensor is blocked. In some cases, a condition of the second sensor may be blocked when the gain 444 is applied to the first audio signal 410 and the gain 444 is less than one, and a condition of the first sensor may blocked when the gain 444 is applied to the first audio signal 410 and the gain 444 is greater than one. In other cases, a condition of the second sensor may be blocked when the gain 444 is applied to the second audio signal 420 and the gain 444 is more than one, and a condition of the first sensor may blocked when the gain 444 is applied to the second audio signal 420 and the gain 444 is less than one.

According to certain aspects, the operations 300 may include mixing 430 the first audio signal 410 to form an output audio signal 490, depending on the condition of the wearable device (e.g., blocked 482, not blocked 484 and windy, or not blocked 484 and not windy). In some cases, when the condition of the wearable device is blocked 482 and the second sensor is blocked, the operations 300 may include mixing 430 the first audio signal 410 to form the output audio signal 490. In other cases, when the condition of the wearable device is blocked 482 and first sensor is blocked, the operations 300 may include mixing 430 the second audio signal 420 to form the optimal output audio signal 490. In still other cases, when the condition of the wearable device is not blocked 484 and windy, the operations 300 may include mixing 430 the first audio signal 410, the second audio signal 420, and/or an MVDR (e.g., determined using the received first audio signal 410 and the second audio signal 420) to form the optimal output audio signal 490 while compensating for the wind. In still other cases, when the condition of the wearable device is not blocked 484 and not windy, the operations 300 may include mixing 430 the MVDR to form the optimal output audio signal 490.

In certain aspects, the operations 300 may not be performed (e.g., may be frozen or paused) when a far-end speaker is communicating (e.g., talking) with user of the device, to prevent interference of the far-end speaker with the operations 300. In these aspects, the operations 300 may resume when the far-end speaker stops communicating. In certain aspects, the user of the device does not need to be communicating (e.g., talking) with someone for the operations 300 to be performed and for the condition of the device to be determined (e.g., at block 306).

In certain aspects, the operations 300 may be performed on devices with any number of sensors. For example, the device may have three sensors, and three audio signals (each received at one of the three device sensors) may be used to determine the sum energy 452, the energy difference 454, the scaled sum energy 456, and the scaled energy difference 458, such that the first ratio 462 and the second ratio 464 may be determined and the condition of the device may be determined.

In some cases, the device may be implemented as a banded headset and may include four sensors on each side (for a total of eight sensors). In these cases, the operations 300 may be performed using audio signals received at some combination of the eight sensors or all of the eight sensors. For example, one or more of the eight audio signals (each received at one of the eight device sensors) may be used to determine the sum energy 452, the energy difference 454, the scaled sum energy 456, and the scaled energy difference 458, such that the first ratio 462 and the second ratio 464 may be used to determine the third ratio 466 and determine and the condition of the device may be determined.

In other cases, the device may be implemented as a banded headset and may include three sensors on each side, one sensor on each side being a VPU (for a total of four sensors and two VPUs). In these cases, the operations 300 may be performed using audio signals received at some combination of the four sensors and two VPUs sensors or all of the four sensors and two VPUs. For example, one or more of the six audio signals (each received at one of the four sensors and two VPUs) may be used to determine the sum energy 452, the energy difference 454, the scaled sum energy 456, and the scaled energy difference 458, such that the first ratio 462 and the second ratio 464 may be used to determine the third ratio 466 and determine and the condition of the device may be determined.

Additional Considerations

It is noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, a phrase describing something being within a range between two values or within a range from one value to another value includes the values of the endpoints in the range. In other words, any phrase describing something being within range used herein is inclusive of the endpoints of the range. As an example, "within a range from 1 and 10" or "within a range between 1 and 10" is intended to cover a range of values from 1 to 10 that includes both 1 and 10.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more computer-executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A system comprising:

a wearable device;

a first sensor coupled to the wearable device;

a second sensor coupled to the wearable device; and one or more processors coupled to the wearable device, the one or more processors, individually or collectively, being configured to:

receive, at the first sensor, a first audio signal;

receive, at the second sensor, a second audio signal;

determine a gain difference between an energy of the first audio signal and an energy of the second audio signal in a frequency range;

apply a gain to the first audio signal to effectively compensate for the gain difference and form a scaled first audio signal;

determine an energy of the scaled first audio signal in the frequency range;

determine a scaled sum that comprises the energy of the scaled first audio signal and the energy of the second audio signal;

determine a scaled difference between the scaled first audio signal and the second audio signal; and determine a condition of the wearable device, comprising:

determining a sum of the energy of the first audio signal and the energy of the second audio signal in the frequency range;

determining a difference between the energy of the first audio signal and the energy of the second audio signal in the frequency range;

determining a first ratio using the sum of the energy of the first audio signal and the second audio signal and the difference between the energy of the first audio signal and the second audio signal;

determining a second ratio using the scaled sum and the scaled difference;

determining a third ratio using the first ratio and the second ratio; and determining that the condition of the wearable device is blocked when at least one of:

the gain is above a gain threshold, the scaled difference is less than the difference between the energy of the first audio signal and the energy of the second audio signal by an energy threshold, or the third ratio is greater than a ratio threshold.

2. The system of claim 1, wherein the one or more processors, individually or collectively, are further configured to:

determine the energy of the first audio signal in the frequency range; and determine the energy of the second audio signal in the frequency range.

3. The system of claim 2, wherein the frequency range comprises 400 Hz to 1 kHz.

4. The system of claim 1, wherein when the condition of the wearable device is blocked, a condition of the second sensor is blocked when the gain is less than one, a condition of the first sensor is blocked when the gain is greater than one.

5. The system of claim 4, wherein when the condition of the wearable device is blocked, the one or more processors, individually or collectively, are further configured to:

when the condition of the second sensor is blocked, mix the first audio signal to form an output audio signal; and when the condition of the first sensor is blocked, mix the second audio signal to form the output audio signal.

6. The system of claim 1, wherein a noise of the first audio signal and a noise of the second audio signal are both above a noise threshold.

7. A method for audio signal processing in a wearable device, the method comprising:

receiving, at a first sensor included in the wearable device, a first audio signal;

receiving, at a second sensor included in the wearable device, a second audio signal;

determining a gain difference between an energy of the first audio signal and an energy of the second audio signal in a frequency range;

applying a gain to the first audio signal to effectively compensate for the gain difference and form a scaled first audio signal;

determining an energy of the scaled first audio signal in the frequency range;

determining a scaled sum that comprises the energy of the scaled first audio signal and the energy of the second audio signal; and determining a scaled difference between the scaled first audio signal and the second audio signal; and determining a condition of the wearable device, comprising:

determining a sum of the energy of the first audio signal and the energy of the second audio signal in the frequency range;

determining a difference between the energy of the first audio signal and the energy of the second audio signal in the frequency range;

determining a first ratio using the sum of the energy of the first audio signal and the second audio signal and the difference between the energy of the first audio signal and the energy of the second audio signal;

determining a second ratio using the scaled sum and the scaled difference;

determining a third ratio using the first ratio and the second ratio; and determining that the condition of the wearable device is blocked when at least one of:

the gain is above a gain threshold, the scaled difference is less than the difference between the energy of the first audio signal and the energy of the second audio signal by an energy threshold, or the third ratio is greater than a ratio threshold.

8. The method of claim 7, wherein the frequency range comprises 400 Hz to 1 kHz.

9. The method of claim 7, wherein when the condition of the wearable device is blocked, a condition of the second sensor is blocked when the gain is less than one, a condition of the first sensor is blocked when the gain is greater than one.

10. The method of claim 9, further comprising:

mixing the first audio signal to form an output audio signal when the condition of the wearable device is blocked and when the condition of the second sensor is blocked; and mixing the second audio signal to form the output audio signal when the condition of the wearable device is blocked and when the condition of the first sensor is blocked.

11. The method of claim 7, further comprising:

determine the energy of the first audio signal in the frequency range; and determine the energy of the second audio signal in the frequency range.

12. The method of claim 7, wherein a noise of the first audio signal and a noise of the second audio signal are both above a noise threshold.

13. A non-transitory computer-readable medium comprising computer-executable instructions that, when executed by one or more processors of a wearable device, cause the wearable device to perform a method for audio signal processing, the method comprising:

receiving, at a first sensor included in the wearable device, a first audio signal;

receiving, at a second sensor included in the wearable device, a second audio signal;

determining a gain difference between an energy of the first audio signal and an energy of the second audio signal in a frequency range; and applying a gain to the first audio signal to effectively compensate for the gain difference and form a scaled first audio signal;

determining an energy of the scaled first audio signal in the frequency range;

determining a scaled sum that comprises the energy of the scaled first audio signal and the energy of the second audio signal; and determining a scaled difference between the scaled first audio signal and the second audio signal; and determining a condition of the wearable device, comprising:

determining a sum of the energy of the first audio signal and the energy of the second audio signal in the frequency range;

determining a difference between the energy of the first audio signal and the energy of the second audio signal in the frequency range;

determining a first ratio using the sum of the energy of the first audio signal and the second audio signal and the difference between the energy of the first audio signal and the second audio signal;

determining a second ratio using the scaled sum and the scaled difference;

determining a third ratio using the first ratio and the second ratio; and determining that the condition of the wearable device is blocked when at least one of:

the gain is above a gain threshold, the scaled difference is less than the difference between the energy of the first audio signal and the second audio signal by an energy threshold, or the third ratio is greater than a ratio threshold.

14. The non-transitory computer-readable medium of claim 13, wherein the frequency range comprises 400 Hz to 1 kHz.

15. The non-transitory computer-readable medium of claim 13, wherein the method further comprises:

determining the energy of the first audio signal in the frequency range; and determining the energy of the second audio signal in the frequency range.

16. The non-transitory computer-readable medium of claim 13, wherein when the condition of the wearable device is blocked, a condition of the second sensor is blocked when the gain is less than one, a condition of the first sensor is blocked when the gain is greater than one.

17. The non-transitory computer-readable medium of claim 16, wherein the method further comprises:

mixing the first audio signal to form an output audio signal when the condition of the wearable device is blocked and when the condition of the second sensor is blocked; and mixing the second audio signal to form the output audio signal when the condition of the wearable device is blocked and when the condition of the first sensor is blocked.

18. The non-transitory computer-readable medium of claim 13, wherein a noise of the first audio signal and a noise of the second audio signal are both above a noise threshold.

* * * * *